Nov. 9, 1971  W. H. LARRIMER, JR., ET AL  3,618,350
REUSABLE TOOLING FOR ELECTROMAGNETIC FORMING
Filed Dec. 15, 1969  2 Sheets-Sheet 1

INVENTORS:
WALTER H. LARRIMER Jr.
JOHN E. McFARLAND
BY

ATTORNEY

United States Patent Office 3,618,350
Patented Nov. 9, 1971

3,618,350
REUSABLE TOOLING FOR ELECTROMAGNETIC FORMING
Walter H. Larrimer, Jr., and John E. McFarland, Seattle, Wash., assignors to The Boeing Company, Seattle, Wash.
Filed Dec. 15, 1969, Ser. No. 885,228
Int. Cl. B21d 26/14
U.S. Cl. 72—56                    10 Claims

ABSTRACT OF THE DISCLOSURE

An electrically conductive and deformable metallic structure of wire braid, wire mesh, metallic fabric, or the like bonded to or imbedded within an elastomeric material. When subjected to an intense varying magnetic field, the metallic structure forceably deforms and the elastomeric material transmits the deforming force to a workpiece forming it into an adjacent die. Upon removal of the magnetic field, the elastomeric material restores the metallic structure to its original configuration. An electrical power supply and an electromagnetic coil selectively generates a magnetic field and restraining members or a mandrel prevents destructive deformation of the magnetic coil.

BACKGROUND OF THE INVENTION

This invention relates to reusable tooling that can be used for the electromagnetic forming of metallic or nonmetallic workpieces.

Electromagnetic forming processes have been used in the prior art for the forming of metallic workpieces in the following manner: electrical currents are induced within a metallic workpiece when it is subjected to an intense varying magnetic field; and the interaction of the electrical currents with the magnetic field produces forces sufficient to drive the workpiece into an adjacent die. In the case of workpieces that are poor electrical conductors, or are electrically non-conductive, an intermediate driver element has been used positioned between the magnetic field generating means and the workpiece. In that case, the interaction between the currents generated in the electrically conductive driver element and the magnetic field produces a force sufficient to drive the driver element against the workpiece and form the workpiece into the die. However, the electromagnetic forces generated are so great that the driver element is permanently deformed and may be found difficult to remove from the formed workpiece. Attempts have been made to circumvent this problem by introducing between the driver element and the workpiece a force transmitting material, such as an elastomer, which transmits the force from the driver element to the workpiece and has some effect in lessening the permanent deformation of the driver element; but it should be understood that even in this latter instance permanent deformation of the driver element necessarily occurs. If the electromagnetic force is to be repeatedly applied to the workpiece in order to produce a deeply formed article, any permanent deformation of the driver element decreases the coupling between the magnetic held producing means and the driver and thus makes less effective each subsequent application of the magnetic field pulse. In addition, any significant permanent deformation of the driver element will make that element unsuitable for forming subsequent workpieces. For these reasons, the electromagnetic forming processes of the prior art have not been successfully adapted to production runs of a large number of workpieces and have been mainly relegated to the forming of workpieces that could not be accomplished by more conventional production methods such as the drop hammer or other types of impact forming.

In addition, the electromagnetic forming processes of the prior art have been difficult to apply efficiently to the forming of metals which are poor eelctrical conductors or to nonmetallic workpieces. The use of an electrically conductive driver element does not completely solve the problem for in many cases the driver element is also deformed along with the workpiece and may be difficult or even impossible to remove from the workpiece after its forming has been completed. With the introduction of stainless steel and titanium alloys in aircraft and other high performance vehicles, these problems associated with electromagnetic forming of poorly conductive metals have assumed great importance. Various methods have been developed to remove the driver element after the stainless steel or titanium part has been formed such as differentially etching of the driver element with chemical solutions or by mechanically breaking up the driver element. Processes such as these for removing the driver element have contributed considerable cost to the forming process which have made electromagnetic forming noncompetitive in cost with other more conventional forming methods.

SUMMARY OF THE INVENTION

It is therefore an object of this invention to provide tooling for electromagnetic forming that is reusable in large capacity production processes.

It is another object of this invention to provide a reusable electromagnetic forming tool that can be used for forming workpieces that are poor conductors of electricity or that are not electrically conductive.

It is another object of this invention to provide an electromagnetic forming tool that can be readily removed from a formed workpiece and reused on a production basis for subsequent electromagnetic forming operations.

These and other objects of this invention have been achieved by incorporating an electrically conductive deformable member within an elastomeric material so that when this assembly is subjected to an intense varying magnetic field, the deformable member is forceably deformed from its original configuration and is transmitted by the elastomeric material to the workpiece to shape the workpiece to an adjacent die. When the electromagnetic field is removed, the elastomeric material, possessing memory capabilities, restores the deformable member to its original configuration at which time it may be readily removed from the formed workpiece and used in subsequent similar forming operations. The deformable material may be made of randomly crumpled metallic foil, electrically conductive wire braid, electrically conductive metallic mesh, or a stretchable fabric woven at least in part from electrically conductive metallic strands. The deformable member may be bonded to or imbedded or encapsulated within the elastomeric material. The elastomeric material may be silicone rubber or a synthetic urathane elastomer. Magnetic field generating means, in the form of an electromagnetic coil, is closely magnetically coupled with the deformable member to ensure efficient energy conversion in the forming process. Restraining or clamping means may be provided adjacent to the magnetic field forming means to prevent destructive deformation thereof.

BRIEF DESCRIPTION OF THE DRAWING

FIG. 4 is a schematic representation of the reusable tooling of this invention used for swaging or grooving a tubular workpiece.

DESCRIPTION OF THE PREFERRED EMBODIMENTS

Figure 1:
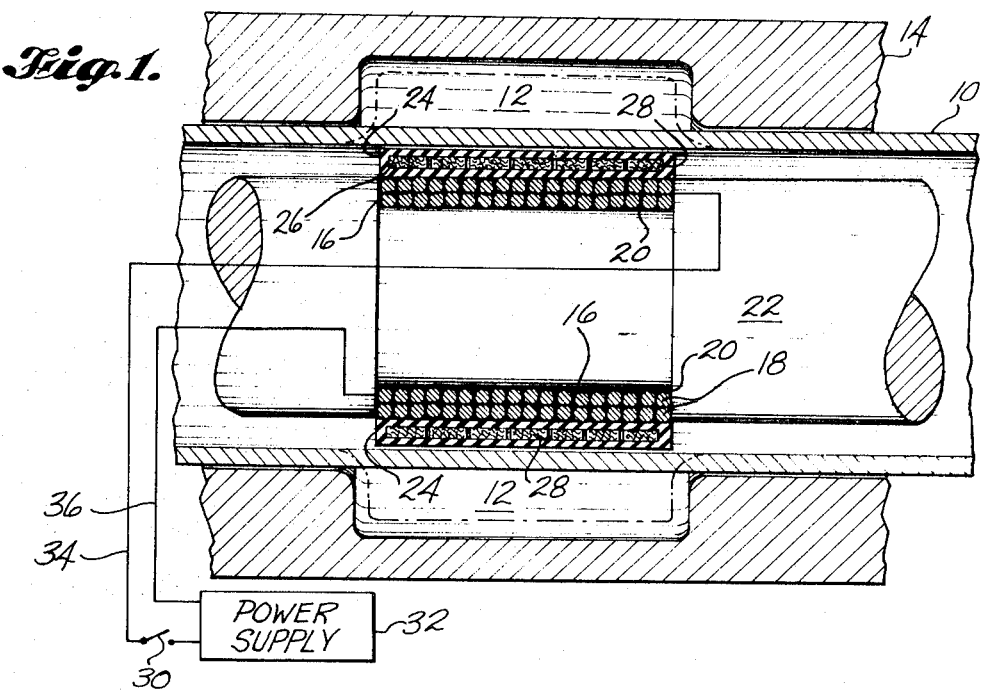
FIG. 1 is a schematic representation of the reusable electromagnetic forming tooling of this invention used to bulge or bead a tubular workpiece into a surrounding die.

In FIG. 1 there is shown a tubular workpiece 10 which is to be bulged into annular cavity 12 of surrounding split die 14. Inserted within the axial bore of tubular workpiece 10 is an electromagnetic coil 16 comprising a plurality of turns of electrically conductive wire 18 covered with an insulation material 20 which may be either an electrically insulating tape or an electrically insulating encapsulant. Electromagnetic coil 16 is conveniently wound around an annular groove in mandrel 22 to facilitate positioning of the coil 16 within the axial bore of workpiece 10 and to restrain coil 16 to prevent its destructive deformation when energized to produce the magnetic field. Interposed between the outer diameter of coil 16 and the inner wall surface of tubular workpiece 10 is the reusable tooling element 24 of this invention conveniently referred to as a transpactor. Transpactor 24 is seen to comprise member 26 made of an elastomeric material into which is imbedded a flexible, deformable, electrically conductive element 28.

Electrical switching means 30 is provided to selectively connect electrical power supply 32 to electromagnetic coil 16 via electrical conductors 34 and 36. When switch 30 is closed, the electrical energy stored in power supply 32, which may comprise primarily a capacitor bank designed to supply sufficient energy for electromagnetic forming in a manner well-known in the art, is delivered to electromagnetic coil 16 to generate an intense varying magnetic field which intersects at least the electrically conductive element 28 of transpactor 24. The magnetic field generated by electromagnetic coil 16 induces electrical currents in element 28 and the interaction of these currents with the magnetic field produces a repulsion force and a consequent radially outward displacement of element 28 imbedded within elastomeric material 26 of sufficient magnitude and energy to form tubular workpiece 10 into cavity 12 of die 14. When power supply 32 is disconnected, by opening switch 30, from the electromagnetic coil 16, the magnetic field is removed and elastomeric material 26, having a memory capability, returns to its original configuration thus restoring the original configuration to element 28. After workpiece 10 has been completely formed and transpactor 24 has returned substantially to its original configuration due to the restoring action of elastomeric material 26 on element 28, transpactor 24 can be readily removed from the axial bore of workpiece 10 and inserted into the axial bore of an other workpiece to repeat the forming operation.

Transpactor 24 should fit closely over electromagnetic coil 16 to provide efficient magnetic coupling between the coil and electrically conductive element 28. However, it is not necessary that transpactor 24 fit as closely within the interior bore of tubular workpiece 10 for as long as a close coupling between electromagnetic coil 16 and electrically conductive element 28 is maintained, a gap between the outer circumference of transpactor 24 and the inside wall surface of workpiece 10 can be tolerated without any serious detrimental effect. This provides an important advantage of the electromagnetic forming tooling of this invention for but one size transpactor and coil assembly is required to successfully and efficiently form a variety of tubular workpieces of the same nominal outside diameter but of various wall thicknesses. This advantage is in marked contrast to prior electromagnetic forming wherein varying wall thicknesses of tubular workpieces required the use of corresponding varying sizes of electromagnetic forming tooling.

Figure 2:
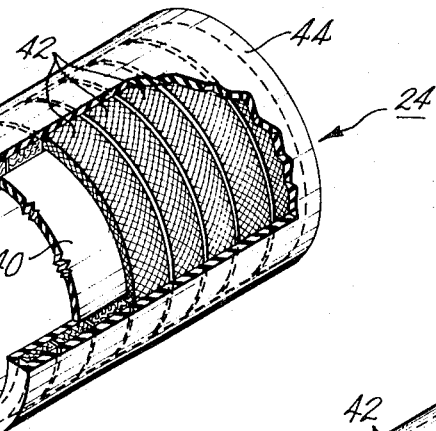
FIG. 2 is a perspective view of one embodiment of the reusable tooling of this invention with portions broken away to show the individual components.

Referring now to FIG. 2 there is shown an embodiment of transpactor 24 which may be conveniently used in the practice of this invention. As shown in that figure, transpactor 24 comprises an inner elastomeric member 40, an outer elastomeric member 44, and an electrically conductive element 42 imbedded therebetween. Electrically conductive element 42 is in the form of a composite tubular sleeve composed of strips of wire braid wound circumferentially about the inner elastomeric member 40. Transpactor 24, as shown in FIG. 2, may be conveniently formed by first fabricating inner tubular member 40 of elastomeric material over which is circumferentially wound and soldered circumferential strips of wire braid material 42. After element 42 has been fabricated in place, an additional outer layer of elastomeric material 44 may be conveniently applied over the length thereof.

Because electrically conductive element 42 is composed of a flexible metallic braid, it is free to either contract or expand in response to an intense varying magnetic field. However, since electrically conductive element 42 is imbedded between elastomeric members 40 and 44, it will be restored to its original configuration after being removed from the intense varying magnetic field. Thus, transpactor 24 may be easily removed from the workpiece after the forming operation is complete and reused for subsequent forming operations. The ease of removal of transpactor 24 from workpiece 10 and its ability to be reused in subsequent successive electromagnetic forming operations offers considerable economic advantages in the application of electromagnetic forming techniques to large scale serial production.

Figure 3:
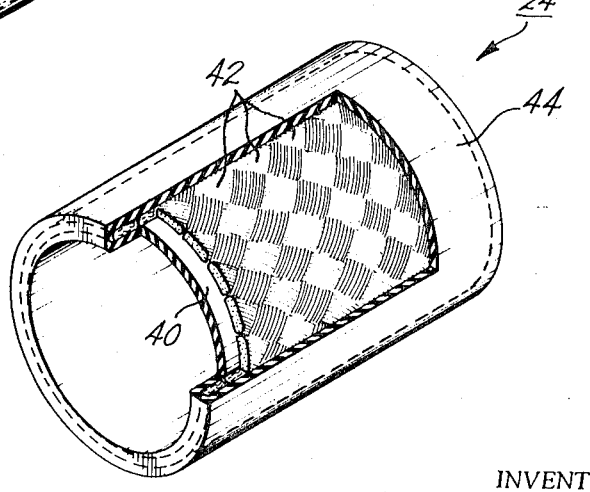
FIG. 3 is a perspective illustration of another embodiment of the reusable tooling of this invention with portions broken away to show the individual components.
Figure 1:
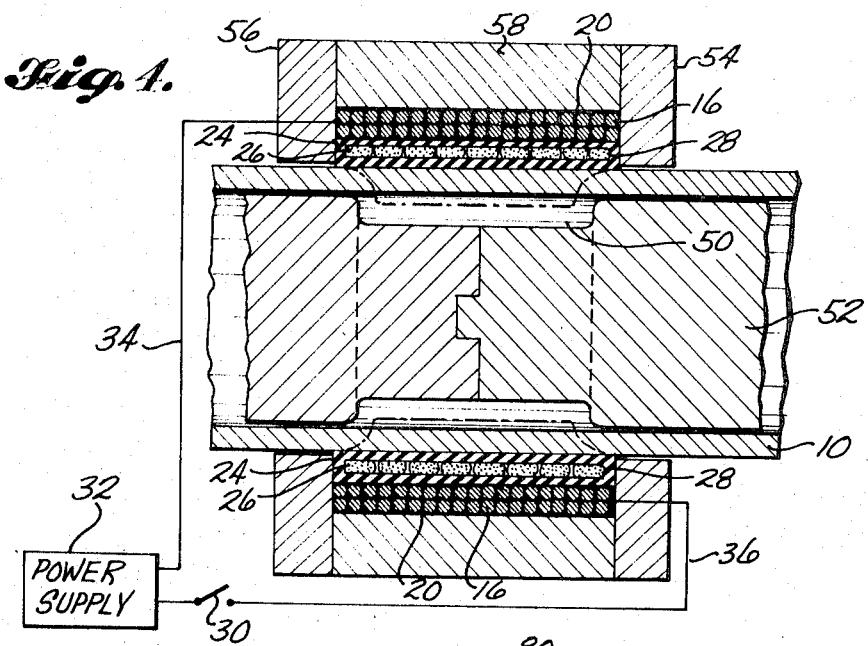

FIG. 3 shows a transpactor configuration which is alternative to that shown in FIG. 2. In FIG. 3, transpactor 24 is seen to again comprise an elastomeric material consisting of an inner portion 40 and an outer portion 44 between which have been imbedded braided metallic strips 42 of electrically conductive material that have been woven to form a sleeve. The woven nature of strips 42 shown in FIG. 3 permits greater expansion or contraction and is particularly advantageous where the forming process requires extreme displacement of the workpiece. However, the configuration shown in FIG. 3 compromises to a certain extent the coupling between electromagnetic coil 16 and the electrically conductive element because only the currents flowing perpendicular to the longitudinal axes of transpactor 24 are effective in producing the electromagnetic forming force. Thus, since braid elements 42 have a woven directional component that is not perpendicular to longitudinal axes of transpactor 24, the electrical currents flowing along braid elements 42 in that direction will not contribute to the forming process. Thus, a trade-off must be made between the increased deformation ability of the configuration of transpactor 24 shown in FIG. 3 and the reduction in coupling efficiency inherent in that configuration.

FIG. 4 illustrates how transpactor 24 may be used in conjunction with electromagnetic coil 16 to form tubular workpiece 10 into the annular cavity 50 of interiorally positioned split die 52 to form an annular groove in workpiece 10. As shown in FIG. 4, tubular workpiece 10 is positioned within the axial bore of transpactor 24, which may be of the configuration shown in either FIG. 2 or FIG. 3, and transpactor 24 is in turn positioned within the axial bore of electromagnetic coil 16. Electromagnetic coil 16 is connected by conductors 34 and 36 to power supply 32 via switch 30. End retaining members 54 and 56 and circumferential retaining member 58 effectively constrains electromagnetic coil 16 to prevent the destructive deformation thereof during its energization. When electromagnetic coil 16 is energized by closing switch 30, an intense varying magnetic field intersects the electrically conductive element 28 of transpactor 24 inducing currents therein. The reaction between these currents and the magnetic field causes transpactor 24 to radially contact with sufficient force to form workpiece 10 into cavity 50 of die 52. When the magnetic field is removed by opening switch 30, the memory capability of the elastomeric material 26 of transpactor 24 restores the electrically conductive element 28 to its original configuration thereby permitting workpiece 10 to be easily withdrawn from transpactor 24. Transpactor 24 is then in condition for subsequent electromagnetic forming operations.

Figure 5:
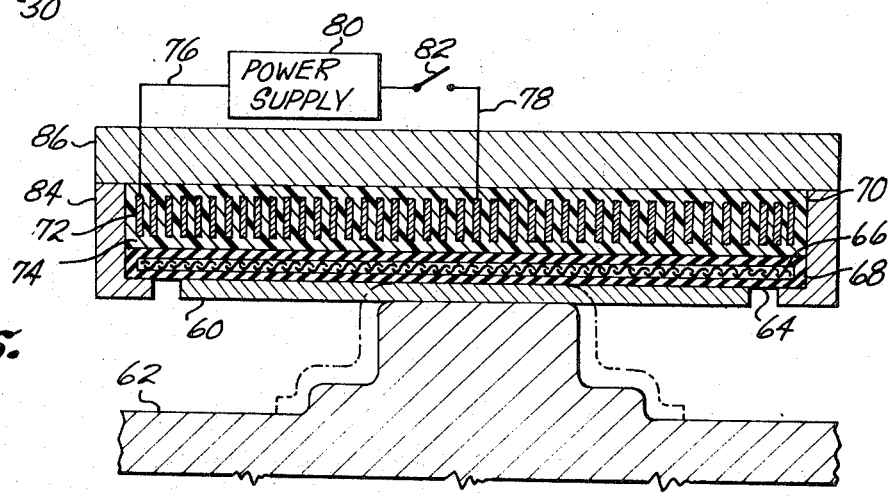
FIG. 5 is a schematic representation of the reusable tooling of this invention used to form a planar blank workpiece to a male die member.

FIG. 5 shows how the reusable tooling of this invention may be used to form a workpiece 60 in the shape of a planar blank onto die member 62. In that figure, planar transpactor 64, comprising an electrically conductive element 66 imbedded within an elastomeric material 68, is placed on top of workpiece 60 which rests upon the upper portion of die member 62. Above transpactor 64 is a spirally wound electromagnetic coil 70 comprising a plurality of spirally wound turns of electrically conductive strips 72 enclosed within an insulating medium 74 which may be electrically insulating tape or an electrical insulating encapsulant. Electromagnetic coil 70 is connected by electrical conductors 76 and 78 to electrical power supply 80 via electrical switch 82. Electromagnetic coil 70 is radially and axially restrained by restraining members 84 and 86, the former of which may also be conveniently used to hold transpactor 68. Upon the energization of electromagnetic coil 70, by the closing of switch 82, the intense varying magnetic field so produced forces transpactor 64 downward forming workpiece blank 60 over die member 62. When the electromagnetic field is removed, by opening switch 82, the memory properties of the elastomeric material 68 of transpactor 64 restores transpactor 64 along with the electrically conductive element 66 back to their original configurations. Transpactor 64 is then ready for subsequent electromagnetic forming operations.

Figure 6:
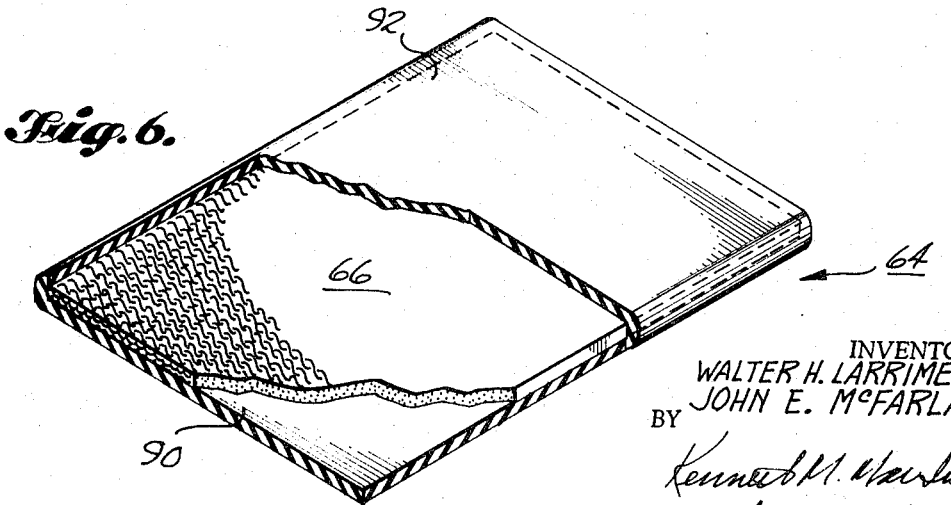
FIG. 6 is a perspective illustration of the reusable tooling of this invention which may be used in the case of the electromagnetic forming shown in FIG. 5.

FIG. 6 shows a transpactor configuration which is useful in the electromagnetic forming operation shown in FIG. 5. In FIG. 6, transpactor 64 is seen to be composed of a first layer 90 and a second layer 92 of elastomeric material between which is imbedded an electrically conductive element 66. In this case, electrically conductive element 66 may be either a thin sheet of crumpled metal foil, such as copper or aluminum foil; a metallic mesh; wire braid; or a stretchable fabric woven at least in part from electrically conductive metallic strands. Transpactor 64 may be conveniently formed by first fabricating layer 90 of an elastomeric material; laying electrically conductive member 66 on top of layer 90; and forming a second top layer 92 of elastomeric material to completely cover or imbed electrically conductive element 66.

While it is generally preferable to imbed or encapsulate the electrically conductive element of the transpactor within the elastomeric material in certain applications, it may be desirable to merely bond the elastomeric material to one surface of the electrically conductive element. However, it has been found that the memory properties of the elastomeric material may be more efficiently used to restore the transpactor to its original configuration after electromagnetic forming when the electrically conductive element is completely imbedded or encapsulated. In addition, it is normally preferable to electrically isolate the electrically conductive element from both the electromagnetic coil and the workpiece in order to prevent the shorting out and destruction or loss of the induced electrical currents within the electrically conductive element during the electromagnetic forming process.

The configurations shown herein for the electrically conductive element of the transpactor are merely illustrative. In addition to the wire braid, crumped metal foils, wire screen, metallic mesh, and metallic fabrics can be successfully employed. What is required is a configuration for the electrically conductive element that will permit deformation, either by contraction or by expansion, well within the elastic limits of the composite element when subjected to an intense varying magnetic field. The electrically conductive element is thereafter restored to its original configuration by the elasticity and memory capability of the elastomeric material within which it is imbedded or to which it is bonded. The elastomeric material may be comprised of any one of a number of appropriate materials such as the silicone rubbers designated RTV by the General Electric Company, and the urathane synthetic materials such as the Hysol urathane elastomers sold by Hysol Division of the Dexter Corporation and the Adiprenes sold by E. I. du Pont de Nemours and Company. Other elastomeric materials may be equally acceptable provided they supply sufficient elasticity and strength to restore the transpactor to substantially its original configuration after it has been used for the electromagnetic forming process. It is also desirable that the elastomeric materials have sufficient strength and toughness to withstand the shock imposed by electromagnetic forming.

What has been provided, then, by this invention is a reusable tooling for electromagnetic forming comprising an electrically conductive element that is bonded to, imbedded within, or otherwise operatively associated with an elastomeric material having memory capability to form a transpactor unit. When the transpactor is subjected to an intense varying magnetic field, it deforms by either contraction or expansion with sufficient force to form an adjacent workpiece to a die. When the electromagnetic field is removed, the transpactor unit returns to its original configuration thereby permitting its easy removal from the formed workpiece and thus making it available for subsequent forming operations.

While various embodiments of the invention have been shown herein as used for electromagnetically forming workpieces into an adjacent die, it is to be understood that in many applications a die in the conventional sense may not be necessary for the successful practice of the invention. For example, in FIG. 1, instead of forming tubular workpiece 10 to surrounding die 14, transpactor 24 could as well be used to form fit or swage workpiece 10 to a fitting or other member in place of die 14. Similarly, in FIG. 4, die 52 could be replaced by a fitting or other member to which it may be desirable to form fit or swage workpiece 10. It is to be understood, therefore, that the term die as used in this application includes fittings or other members having a receiving surface to which it is desired to form, form fit, or swage the workpiece.

In other instances, transpactor 24 may be used within the teachings of this invention to free form a workpiece where the exact configuration of the formed workpiece is not critical. Thus, where a bulge or annular groove of wide tolerance is desired in a tubular workpiece such as is shown in FIG. 1 or 4, die 14 or 52 would not be necessary. Similarly, planar transpactor 64 shown in FIGS. 5 and 6 may be used to free form either a planar or curvilinear workpiece, such as welded panels, where it is desired to eliminate any mismatch between such panels.

Various other changes and modifications may be made in the above described invention for reusable electromagnetic forming tooling without deviating from the spirit and scope of the present invention.

We claim:

1. A reusable electromagnetic forming tool for use in combination with an electromagnetic forming apparatus of the type having an electromagnetic coil and means for selectively energizing the electromagnetic coil to generate a varying magnetic field for forming a workpiece comprising:

(a) a first member of flexible, deformable, electrically conductive material for placement between the electromagnetic coil and the workpiece which, when subjected to the electromagnetic field, will forcibly deform from its original configuration to form the workpiece; and (b) a second member of elastomeric material;

(c) said first member being embedded within said second member; and said second member being effective to transmit the deformation force of said first member to the workpiece, and said second member being further effective to restore said first member to substantially its original configuration upon removal of the electromagnetic field.

2. The reusable electromagnetic forming tool as claimed in claim 1 wherein said second member is a hollow cylinder having a substantial wall thickness; and wherein said first member is a cylindrical sleeve embedded coaxially within the wall thickness of said first member.

3. The reusable electromagnetic forming tool as claimed in claim 1 wherein said second member is a planar sheet of substantial thickness and wherein said first member is a thin planar sheet embedded within the thickness of said second member.

4. An apparatus for electromagnetically forming a tubular workpiece, having an axial bore, to an adjacent receiving surface comprising:

(a) a tubular elastomeric member having an axial bore and sized for co-axial positioning in cylindrical surface contact with the tubular workpiece;

(b) a flexible radially deformable electrically conductive tubular element co-axially imbedded within and elastomeric member; and (c) means, including an electromagnetic coil, for selectively generating a varying magnetic field intersecting said element for forcibly radially deforming said element from its original configuration;

whereby, upon generating the magnetic field the elastomeric member transmits the radial deformation force of said element to the workpiece to form the workpiece to the adjacent receiving surface and upon removing the magnetic field the elastomeric member restores said element to substantially its original configuration.

5. The apparatus as claimed in claim 4 wherein said element is comprised of electrically conductive wire braid.

6. The apparatus as claimed in claim 4 wherein said element is comprised of crumpled electrically conductive metallic foil.

7. The apparatus as claimed in claim 4 wherein said element is comprised of electrically conductive metallic mesh.

8. The apparatus as claimed in claim 4 wherein said element is comprised of a stretchable fabric woven, at least in part, from electrically conductive metallic strands.

9. The apparatus as claimed in claim 4 wherein the tubular elastomeric member is sized for co-axial positioning within the axial bore of the workpiece and wherein said means for generating a magnetic field includes a torroidal shaped electromagnetic coil positioned within the axial bore of said member and closely co-axially coupled with said element to forcibly radially expand said element, in response to the magnetic field, toward the workpiece to form the workpiece to the receiving surface positioned exteriorly of the workpiece.

10. The apparatus as claimed in claim 4 wherein the axial bore of said tubular elastomeric member is sized for co-axially receiving the workpiece therein and wherein said means for generating a magnetic field includes a torroidal shaped electromagnetic coil positioned around said member and closely co-axially coupled with said element to forcibly radially contract said element, in response to the magnetic field, toward the workpiece to form the workpiece to the receiving surface positioned interiorly of the workpiece.

References Cited

UNITED STATES PATENTS

| | | | |
|---|---|---|---|
| 3,380,271 | 4/1968 | Habdas | 72—56 |
| 3,387,476 | 6/1968 | Günther | 72—56 |
| 3,438,230 | 4/1969 | Dietz et al. | 72—56 |
| 3,115,857 | 12/1963 | Pfanner | 72—56 |
| 3,279,228 | 10/1966 | Brower | 72—56 |

RICHARD J. HERBST, Primary Examiner